United States Patent
Swope et al.

(10) Patent No.: US 6,633,095 B1
(45) Date of Patent: Oct. 14, 2003

(54) MOTION DEVICE USING SHAPE MEMORY MATERIAL AND METHOD THEREFOR

(76) Inventors: Charles B. Swope, 4912 NW. 58th Ter., Coral Springs, FL (US) 33067; Patrick D. Koskan, 9437 Rodeo Dr., Lake Worth, FL (US) 33467; Jorge L. Garcia, 9863 NW. 9th Ct., Plantation, FL (US) 33324

(*) Notice: Subject to any disclaimer, the term of this patent is extended or adjusted under 35 U.S.C. 154(b) by 0 days.

(21) Appl. No.: 09/258,921

(22) Filed: Mar. 1, 1999

(51) Int. Cl.[7] .............................................. H02K 41/00
(52) U.S. Cl. ........................................ 310/12; 310/307
(58) Field of Search .................................. 310/12, 307

(56) References Cited

U.S. PATENT DOCUMENTS

| | | | |
|---|---|---|---|
| 5,159,224 A | 10/1992 | Kramer et al. ............... | 310/323 |
| 5,306,979 A | 4/1994 | Schwarz, Jr. ................ | 310/328 |
| 5,543,678 A | 8/1996 | Hoiberg ...................... | 310/307 |
| 5,553,328 A | 9/1996 | Hall et al. ...................... | 2/422 |
| 5,831,820 A | 11/1998 | Huang .......................... | 361/686 |

*Primary Examiner*—Nestor Ramirez
*Assistant Examiner*—Judson H. Jones

(57) ABSTRACT

A motion device (100) includes a shape memory transducer (110) having a preset memory state and logically divided into first and second portions (116, 118). A coupled electrical circuit (130) is operable to selectively energize the first portion (116) to create a force that moves the first portion (116) toward its memory state which moves the second portion (118) in a first direction out of its memory state, and to selectively energize the second portion (118) to create a force that moves the second portion (118) towards its memory state which moves the first portion (116) away from its memory state in a second direction different from the first direction. A feedback system (120) is preferably included to provide for precise motion control.

22 Claims, 2 Drawing Sheets

MOTION DEVICE USING SHAPE MEMORY MATERIAL AND METHOD THEREFOR

TECHNICAL FIELD

This invention relates in general to motion devices, and in particular, to motion devices that employ shape memory material.

BACKGROUND OF THE INVENTION

Certain materials are known to have the property of returning to a preset shape from a deformed shaped upon heating or upon application of electrical stimulation. Such materials are commonly referred to as having shape memory in recognition of this memory effect. Shape memory materials are available with a wide variety of properties, and construction parameters can be manipulated to vary factors such as the preset shape, the force exhibited by the material when returning to its preset shape, the force required to deform the material from its preset shape, the transition temperature, and the like.

The prior art describes a variety of ways to utilize the transducer properties of shape memory materials in the construction of devices such as motors, actuators, solenoids, and other mechanisms requiring mechanical motion. Generally, such applications employ an external force such as a spring, cantilever member, or the like, to deform the shape memory material from its preset shape, and heat or electrical stimulus to return the material to its predeformed state.

A shape memory alloy application is described in U.S. Pat. No. 543,678 issued to Hoiberg on Aug. 6, 1996, entitled FLAT MOTORS, in which a shape memory actuator wire is used to deflect a resilient cantilever arm that drives mechanical operation of the motor. Here, the shape memory actuator wire is heated through stimulation by an electrical pulse, and contracts to its memory shape, thereby pulling the cantilever arm to a particular position. When stimulation ceases, the actuator wire cools, such as by ambient air cooling, and the resilient lever arm acts to deform, or stretch, the actuator wire. In another application described in U.S. Pat. No. 5,55,328, issued to Hall et al. on Sep. 6, 1996 for an AUTOMATICALLY DEPLOYABLE AND RETRACTABLE COMBINER MECHANISM, a combination of a conventional spring and a shape memory alloy spring is used to detract and deploy a combiner attached to a helmet. A more complex system is described in U.S. Pat. No. 5,316,979 issued to Schwatz, Jr. on Apr. 26, 1994 for a MULTIPLEXING INCREMENTAL LINEAR ACTUATOR SYSTEM, in which multiple shrinkable wires provide incremental linear movement, and a return spring provides a countervailing force.

Linear servo mechanisms are known in which precise mechanical movements are effectuated by using an electro-mechanical device, such as an electrical motor, and feedback systems to ensure precise positioning of elements. However, linear servo control is typically performed by solenoids, screw motors and pneumatics, and often have elaborate construction. As the requirement grows for more miniaturized mechanical devices, there is a need to have linear servo devices having simple construction with the minimum number of moving parts.

Shape memory transducers have been employed together with other force generating mechanisms in devices that provide mechanical motion. Such devices tend to be complex and have construction that do not facilitate miniaturization. Therefore, a new type of motion device that uses shape memory material is needed, that provides for utility and flexibility with low cost and complexity.

DETAILED DESCRIPTION OF THE PREFERRED EMBODIMENT

The present invention provides for a motion device that uses a shape memory transducer to provide controlled movement of a mechanically coupled item or actuator. The motion device includes an electrical circuit operable to selectively energize different portions of the shape memory transducer, in response to motion control inputs, to move at least a portion of the shape memory transducer in opposing directions. Preferably, a feedback system having input related to the location of the coupled item or related to location of at least one portion of the shape memory transducer, is also coupled to the electrical circuit in order to provide for precise motion control.

Figure 1:
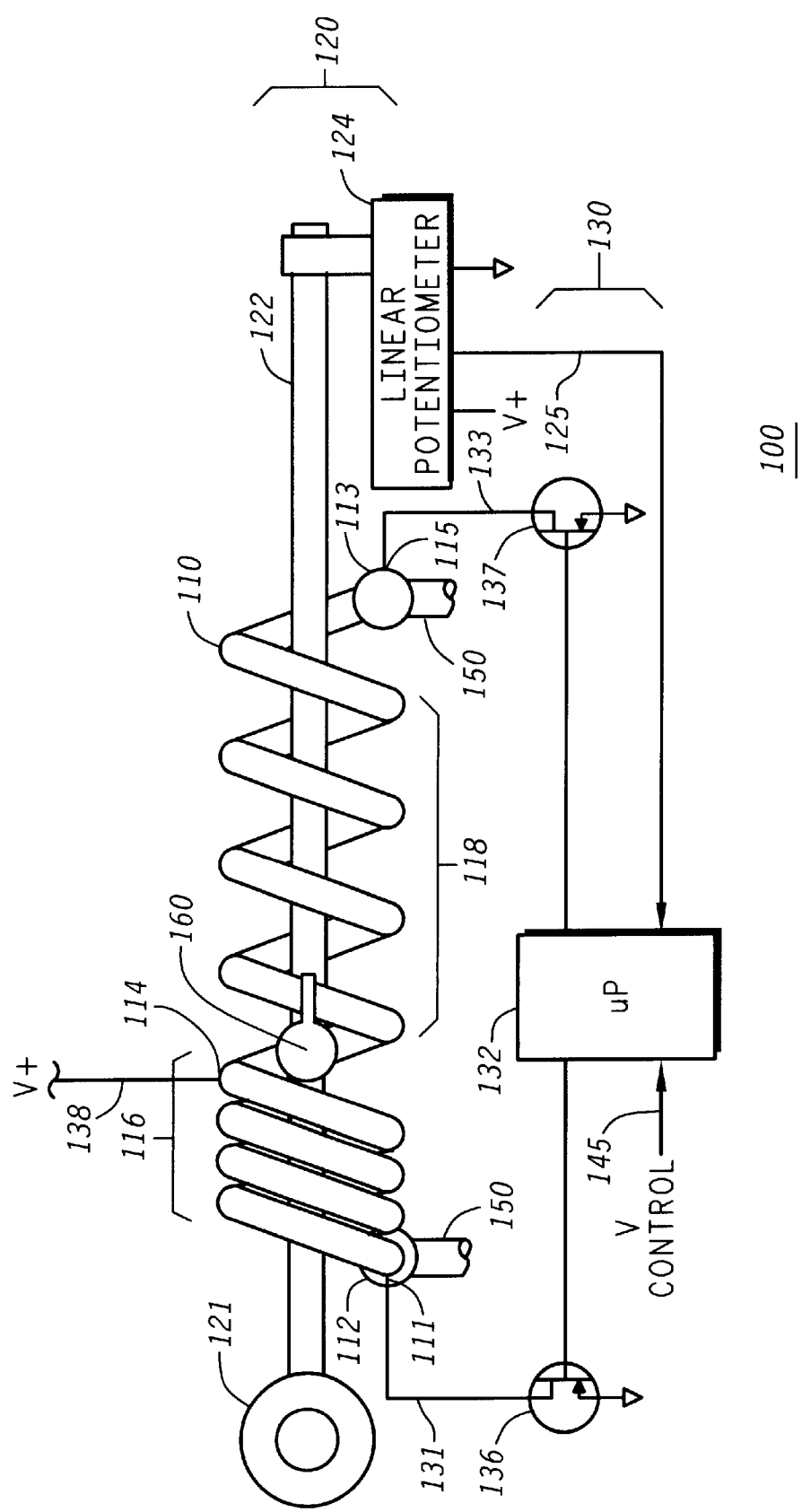
FIG. 1 is an electro-mechanical diagram of a portion of a linear servo device that employs a shape memory transducer for positioning an actuator, in accordance with the present invention.

Referring to FIG. 1, an electro-mechanical diagram of a portion of a motion device 100 is shown, in accordance with the present invention. The motion device 100 includes a shape memory transducer 110, a coupled item 122, electrical circuitry 130, and a feedback system 120, all arranged to provide a linear servo system. The shape memory transducer 110 preferably has a memory state shape corresponding to a coil. Other shapes may be selected for this and other types of applications.

In the preferred embodiment, the shape memory material is a nickel-titanium alloy that can be deformed and later caused to remember its original shape by application of heat. Preferably, such heat is generated by passing an electrical current through the shape memory material which heats the material as a result of the electrical resistance of the material. The shape memory material is preferably selected to deliver a force under electrical current excitation greater than that exhibited under no electrical current excitation. Thus, the force required to deform the material from its preformed shape or memory state under no heat or electrical stimulus is less that the force exhibited by the material when returning to its memory state when heat or electrical stimulation is applied. A variety of materials are known to exhibit the memory effect described herein. The selection of the material, the desired characteristics, including its shape, thickness and the like depend on the particular type of motion device to be constructed.

The shape memory transducer may have a variety of configurations. In the preferred embodiment, the shape memory transducer has the form of a single continuous strand of shape memory material. In an alternative embodiment, an array of shape memory alloy wires is used to promote increased strength while affording rapid cooling. The shape memory transducer may also be formed using segments of shape memory material which are mechanically link or coupled in a similar manner. Those skilled in the art would appreciate that a wide variety of configurations are possible.

The shape memory transducer 110 is anchored at spatially separated points 112, 113, to a support structure 150. A coupled item 122, such an actuator, lever arm, or the like, is attached, or otherwise mechanically coupled, to a point 160 on the shape memory transducer 110 in between the anchor points 112, 113. The actuator 122 provides a mechanism for transferring the motion of the shape memory transducer in order to do work.

Electrical connections to the shape memory transducer 110 are supported by three ports 111, 114, 115 located thereon. The electrical ports 111, 114, 115 are sequentially arranged in a spaced apart manner, and provide for connection of the electrical circuit 130 to the shape memory transducer 110. At least one port 114 is positioned in between the spaced apart anchor points 112, 113 on the shape memory transducer. This port 114 supports an electrical connection to the electrical circuit 130, and logically separates the shape memory transducer 110 into first and second portions 116, 118.

The electrical circuit 130 includes a controller or microprocessor 132, and switches 136, 137 that couple two electrical signal lines 131, 133, from the controller 132 to electrical ports 111, 115 on the shape memory transducer 110. A third signal line 138 is coupled to the centrally located electrical port 114. The controller 132 has a motion control input 145 and a feedback signal input 125 from the feedback system 120. The switching circuitry 136, 137 operates under the control of the controller 132 in a response to motion control inputs via signal line 145, and inputs from a feedback signal related to the location of at least a portion of the shape memory transducer to control movement of the shape memory transducer 110. Particularly, there is at least one switch 136, 137 selectively controlled by the microprocessor to alternatively route electrical signals to the first or second portion 116, 118, of the shape memory transducer 110. In other words, the controller operates the switching circuitry 136, 137 to control movement of the shape memory transducer in different directions, depending on the portion of the shape memory transducer energized. Thus, in general, the electrical circuit is responsive to the motion control input 145 and to the feedback signal 125 to selectively apply electrical current to any one of a plurality of different portions 116, 118, of the shape memory transducer, to move the coupled item 122 to a desired location.

The feedback system 120 includes the actuator 122, which centrally traverses the coil loop of the shape memory transducer. The actuator 122 is attached at one end to a controlled item 121, and attached at another end to a linear potentiometer 124. The linear potentiometer 124 provides a voltage that corresponds to the overall position of the shape memory transducer 110 with respect to the actuator 122. The voltage output of the linear potentiometer 124 provides the feedback signal 125, which relates to the location of the at least a portion of the shape memory transducer with respect to the actuator 122. The feedback system 120 is also used for position stabilization purposes, such as to correct for overt or erroneous micromovements due to ambient temperature changes.

The electrical system 130 is operable to selectively apply an electrical current to one or more portions 116, 118 of the shape memory transducer 110 to create in one instance a force to move a portion of the shape memory transducer in one direction, and in another instance a force to move that portion of the shape transducer in another direction different from the first direction.

Figure 2:
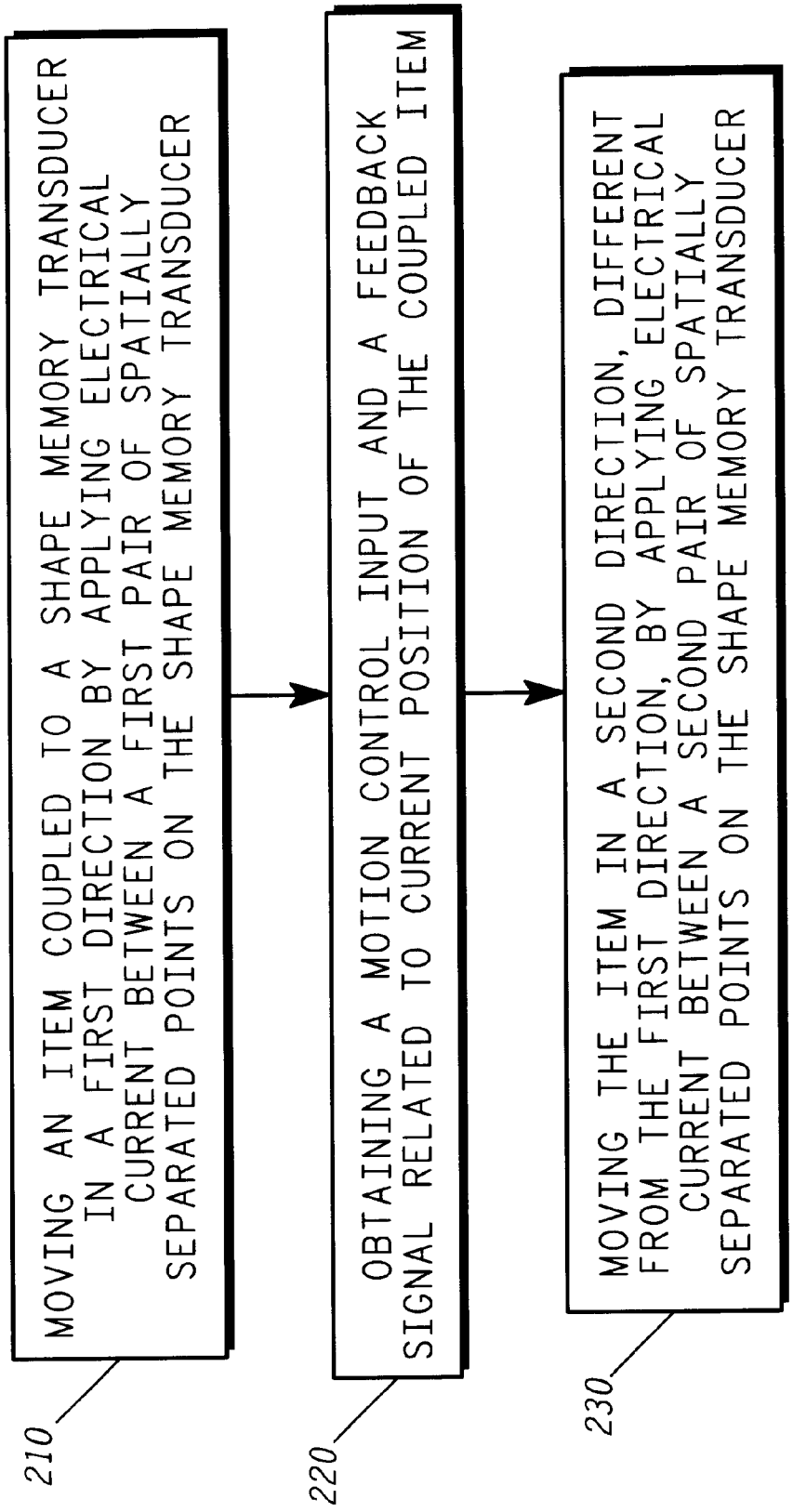
FIG. 2 is a flowchart of procedures used to provide controlled mechanical motion, in accordance with the present invention.

FIG. 2 shows a flow chart of procedures 200 that summarize operation of the motion control device, in accordance with the present invention. In response to a motion control input, a portion of a shape memory transducer is moved in a first direction, by applying electrical current between a first pair of spatially separated points on the shape memory transducer, step 210. This effectively positions an actuator or other item coupled to that portion of the shape memory transducer at a first location. A motion control input is obtained together with a feedback signal related to the current position of the coupled item, step 220. Subsequently, a second pair of spatially separated points on the shape memory transducer is selected different from the first pair based upon a combination of the feedback information and desired location information. The coupled item is then sequentially moved in a second direction, different from the first direction, by applying an electrical current between the second pair of spatially separated points of the shape memory transducer, step 230. Thus, the coupled item is sequentially positioned at a second location different from the first location through application of the electrical current of a second pair of spatially separated points on the shape memory transducer. In this manner, the motion device moves the coupled item in first and second opposing directions by applying electrical current through at least one of a plurality of different portions of the first memory transducer. Preferably, the first and second pair of spatially separated points are together located on a continuous strand of shape memory material that comprise the shape memory transducer.

The present invention offers significant advantages over the prior art. A stable linear servo control system can be developed in accordance with the present invention using a single continuous strand of shape memory material, such as nickel titanium alloy wire, as a sole mechanical means for delivering force and motion in opposing directions. The shape memory material is used to provide bi-directional motion, and in the preferred embodiment, is used as a part of an electronic linear servo control system that utilizes switches, a feedback mechanism, and a controller to provide precise controlled operation. Although the structure and design of the shape memory transducer of the preferred embodiment is in the form of a coil, other configurations may be used with equally impressive results. Bi-directional motion is performed by applying current to a portion of the element, thereby eliminating the need for a counterforce mechanism such as a spring, lever arm, or the like as used in the prior art. The present invention is not limited to the provision of two excitation points on the shape memory transducer, and more complex motions and servo mechanisms can be achieved with more complex designs. Significantly, there is no external force required to move portions of the shape memory transducer to and from their memory positions. Thus, motion devices can constructed according to the present invention using simpler designs that are more suited for miniaturized applications.

What is claimed is:

1. A motion device, comprising:
   a shape memory transducer having first and second portions that are mechanically coupled, and that have first and second memory states, respectively; and
   an electrical system coupled to the first and second portions and operable to selectively apply an electrical current to the first portion to create a force that moves the first portion toward its memory state thereby moving the second portion in a first direction out of its memory state, and an electrical signal to the second portion thereby creating a force that moves the second portion towards its memory state thereby moving the first portion out of its memory state in a second direction different from the first direction.

2. The motion device of claim 1, wherein the shape memory transducer has a single element, single-piece construction.

3. The motion device of claim 2, wherein the shape memory transducer is formed from a nickel-titanium alloy.

4. The motion device of claim 2, wherein the shape memory transducer has a memory state form factor corresponding to a coil.

5. The motion device of claim 2, wherein the shape memory transducer is formed from a material that exhibits a force under current excitation greater than that exhibited under no current excitation.

6. The motion device of claim 2, wherein the electrical circuit comprises a feedback system that generates a feedback signal related to location of at least a portion of the shape memory transducer.

7. The motion device of claim 1, wherein the electrical system comprises a controller that controls movement of the shape memory transducer.

8. The motion device of claim 7, wherein the electrical system comprises at least one switch selectable, controlled by the controller, to alternatively route electrical signals to the first portion and to the second portion of the shape memory transducer.

9. The motion device of claim 1, wherein the shape memory transducer comprises a continuous piece of shape material anchored at first and second spaced apart locations, and wherein the electrical system has an electrical connection at an attachment point on the shape memory transducer in between the first and second spaced apart locations that logically separates the shape memory transducer into the first and second portions.

10. An apparatus, comprising:
a shape memory transducer having first, second, and third electrical ports sequentially arranged thereon in a spaced apart manner; and
an electrical circuit operable to selectively energize the shape memory transducer between the first and second electrical ports, or alternatively, between the second and third electrical ports to provide controlled movement of the shape memory transducer.

11. The apparatus of claim 10, further comprising a feedback system having an input related to location of at least one portion of the shape memory transducer, wherein the feedback system is coupled to the electrical circuit.

12. The apparatus of claim 11, wherein electrical circuit comprises:
a switching circuit coupled to the first, second, and third electrical ports; and
a controller that controls movement of the shape memory transducer through operation of the switching circuit.

13. The apparatus of claim 10, wherein the shape memory transducer has a shape corresponding to a coil.

14. The apparatus of claim 10, wherein the shape memory transducer consists of a single continuous strand of shape memory material.

15. A linear servo control system, comprising:
a support structure;
a shape memory transducer anchored to the support structure;
an actuator mechanically coupled to the shape memory transducer;
a feedback circuit that outputs a feedback signal corresponding to location of the actuator; and
an electrical circuit coupled to the feedback circuit and to the shape memory transducer, and having a motion control input related to a desired location for the actuator, wherein the electrical circuit is responsive to the motion control input and to the feedback signal to selectively apply electrical current to any one of a plurality different portions of the shape memory transducer to move the actuator to the desired location.

16. The linear servo control system of claim 15, wherein the shape memory transducer consists of a single continuous strand of shape memory material.

17. The linear servo control system of claim 16, wherein the shape memory transducer has a shape corresponding to a coil.

18. The linear servo control system of claim 15, wherein the shape memory transducer is formed from a material that exhibits a force under current excitation greater than that exhibited under no current excitation.

19. A method for using a shape memory element to provide for motion control of a controlled item mechanically coupled thereto, the method comprising the steps of:
positioning the controlled item at a first location by applying electrical current between a first pair of spatially separated points on the shape memory element; and
sequentially positioning the controlled item at a second location different from the first location by applying electrical current between a second pair of spatially separated points on the shape memory element, different from the first pair, on the shape memory element.

20. The method of claim 19, wherein the shape memory element comprises a continuous strand of the of the shape memory material, and the first and second pairs of spatially separated points are together located on the continuous strand of the of the shape memory material.

21. The method of claim 19, further comprising the steps of:
obtaining desired location information for a controlled item;
obtaining feedback information related to current location of the controlled item;
selecting a pair of spatially separated points on the shape memory element based on a combination of the feedback information and the desired location information; and
applying electrical current between the selected pair of spatially separated points to position the controlled item in accordance with the desired location information.

22. The method of claim 19, further comprising the step of moving the controlled item in first and second opposing directions by applying electrical energy through at least one of a plurality of different portions of the shape memory element.

* * * * *